March 17, 1970  M. E. RICH, JR  3,501,119
BICYCLE SEAT SUPPORTING PIVOT MEANS
Filed Aug. 1, 1968
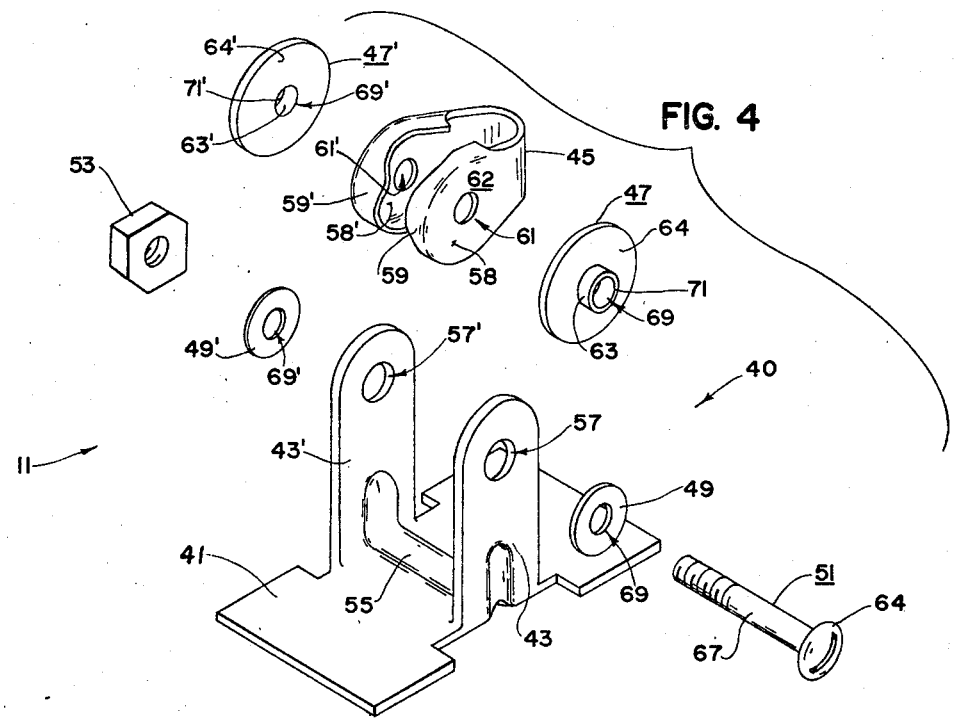
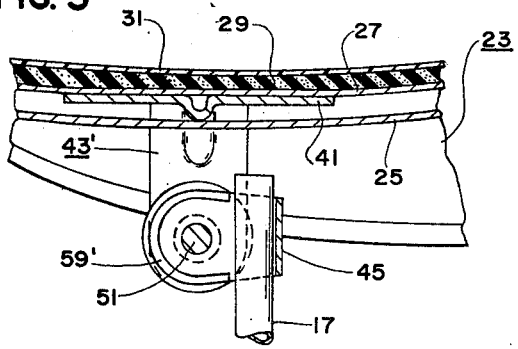
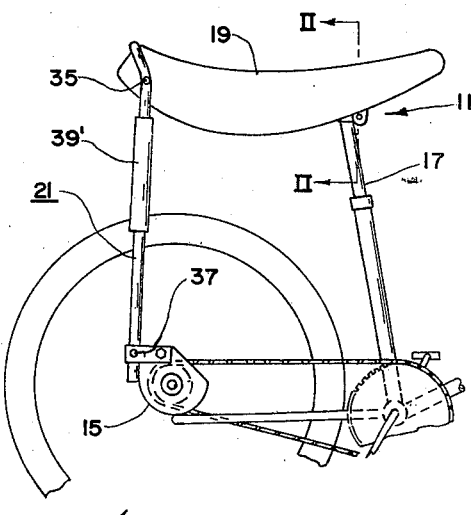
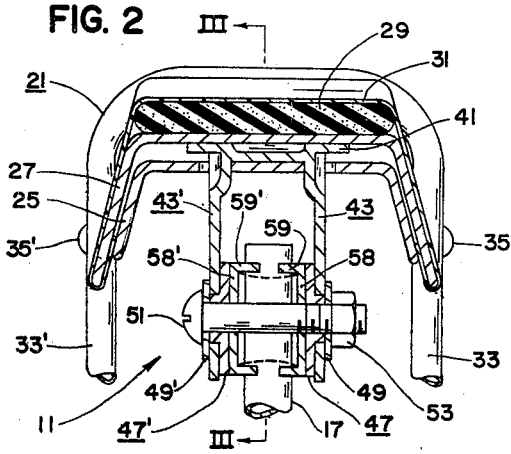
INVENTOR.
MAURICE E. RICH, JR.
BY John R. Walker, III
Attorney United States Patent Office 3,501,119
Patented Mar. 17, 1970

3,501,119
BICYCLE SEAT SUPPORTING PIVOT MEANS
Maurice E. Rich, Jr., Memphis, Tenn., assignor to Troxel Manufacturing Company, Moscow, Tenn., a corporation of Ohio
Filed Aug. 1, 1968, Ser. No. 749,357
Int. Cl. B62j 1/04; F16m 11/00, 11/06, 11/10, 11/12, 13/04
U.S. Cl. 248—221                                      2 Claims

ABSTRACT OF THE DISCLOSURE

Means for pivotally anchoring the forward end portion of an elongated seat on a bicycle frame structure seat post. The pivot axis of the seat supporting structure being arranged horizontally and the rearward end portion of the bicycle seat being sprung upwardly in a swinging arc about the pivot axis arranged on the forward end of the seat. The bicycle seat pivot means being adapted to pivotally anchor the forward end portion of the seat for permitting free up-and-down pivotal movement of the rear portion of the bicycle seat.

BACKGROUND OF THE INVENTION

Field of the invention

The invention relates to bicycle seat supporting means and particularly to such means applicable for supporting elongated bicycle seats.

Description of the prior art

Prior to the invention disclosed and claimed in the patent application for "Saddle Support Means," Ser. No. 654,238, filed July 18, 1967, owned by the assignee of the present invention, the typical elongated bicycle seat was rigidly supported adjacent the rearward and forward ends thereof. Adjacent the forward end, it was supported from the post of the bicycle by suitable clamps or the like, as for example, by a clamp similar to that shown in Patent No. 2,946,372, also owned by the assignee of the present invention. Adjacent the rearward end of the elongated seat or saddle, it was supported from the bicycle frame structure adjacent the axis of the rear wheel of the bicycle by a rigid support. The present invention mainly concerns the forward pivotal mounting of the elongated bicycle seat on the bicycle seat post, and is an improvement over the forward pivotal mounting shown in said patent application, Ser. No. 654,238. In said patent application Ser. No. 654,238, there are disclosed two types of support means for supporting the forward portion of an elongated seat which include (1) a pair of plate-like parallel arranged reach portions dependingly fixed on the under-surface of the bicycle seat body and including a horizontally extending bolt extending through the reach portions and the upper end portion of the bicycle seat post. In such mounting means, the pivot axis of the seat is coincident with the pivot bolt extending through the seat post and the up and down pivotal movement of the seat is substantially about the pivot bolt passing through the seat post; (2) pivot means arranged in conjunction with the auxiliary spring means arranged on the forward end of the bicycle seat. In such seat-supporting means, a pair of generally parallel arranged horizontally extending reach portions sweep upwardly and forwardly and pivotally connect to the forward underportion of the bicycle seat. The rearward distal end portions of the paired reach portions provide base means for supporting vertically arranged helical springs interposedly secured between the reach portions and the underside of the bicycle seat body. In bicycle seat support means such as this the pivot axis is arranged forwardly and above the upper terminus of the seat post and is arranged at the upper terminus of the upwardly converging reach elements of the seat support structure.

A problem of particular significance in the seat support structure of either of the above-mentioned seat support means is the tendency for the rearward portion of the bicycle seat to swing laterally left and right as the bicycle is being operated. The loose lateral swinging movement of the rear portion of the seat causes the bicycle rider not to have firm seating and causes some discomfort to the rider. Another problem in the prior seat support structures, and particularly a problem associated with the seat support structure as outlined at (1) above, is the difficulty or impossibility of shifting the pivot support means forwardly or rearwardly relative to the bicycle seat post. In bicycle seat support structures as outlined at (1) above, and such pivot means having a pivot bolt extending through the upper terminus of the seat post, it is impossible to position the seat longitudinally relative to the seat post; since the seat is pivotally fixed on the seat post, it is impossible to adjust the fore and aft position of the seat relative to the bicycle frame.

SUMMARY OF THE INVENTION

The present invention presents a mechanically simple but effective means for pivotally supporting the forward portion of an elongated bicycle seat. The inventive structure permits free up and down pivotal movement of the seat but substantially restricts lateral left and right shifting movement of the rear of the seat as the bicycle is being operated. The bicycle seat anchoring pivot means of the invention also permits forward and rearward adjustment of the seat for readily positioning the seat at a position comfortable to the bicycle rider.

BRIEF DESCRIPTION OF THE DRAWING

FIG. 1 is a side elevational view of the bicycle seat supporting pivot means of the present invention illustrated in its environment and illustrating also the rearward structure of a bicycle.

FIG. 2 is a vertical plane sectional view of the bicycle seat supporting structure taken as on the line II—II of FIG. 1.

FIG. 3 is a vertical plane sectional view taken as on the line III—III of FIG. 2.

FIG. 4 is a perspective view of the bicycle seat supporting structure with the various parts being in an individually arranged configuration.

DESCRIPTION OF THE PREFERRED EMBODIMENT

The seat supporting structure of the present invention is indicated by numeral 11 and will be described in conjunction with a bicycle 13 having a frame 15, a seat post 17, an elongated bicycle seat 19, and resilient support means supporting the rearward portion of the bicycle seat including a generally inverted U-shaped resilient brace 21. It should be pointed out that the elongated seat or saddle 19 with which the support means 11 of the present invention is used is that well known type of seat which the assignee of the present invention and others presently manufacture and which said assignee refers to its seat by the trademark "Banana-Seat." Thus, when the term "elongated bicycle saddle" or "elongated bicycle seat" is used in the present application, it is deemed to mean that particular type of seat or saddle illustrated and others similar to it and which is referred to by the name "Banana-Seat," among other names. Elongated bicycle seat 19 includes a body 23 formed substantially of inner and outer sheet metal contoured base members 25, 27, padding structure 29 and sheet material cover structure 31 laminatingly secured over sheet metal outer base 27. Inverted U-shaped brace 21 is preferably like that disclosed in said patent application, Ser. No. 654,238, and includes vertically parallel arranged brace leg structures 33, 33', and upper and lower pivot means 35, 37 pivotally securing respectively upper and lower portions of brace legs 33, 33' on bicycle seat 19 and on frame 15. Leg structures 33, 33' include respectively simultaneously operative spring means 39, 39' (spring means 39 not shown) providing resilient extension means for the leg structures and providing means for resiliently supporting the rearward portion of the bicycle seat.

Seat supporting pivot means 11 basically includes a pivot bracket 40 having a horizontal portion 41 and reach elements 43, 43'; a generally U-shaped clamp 45, a pair of shoulder washers 47, 47'; a pair of flat washers 49, 49', and bolt and nut means 51, 53.

Pivot bracket 40 is secured subjacently on bicycle seat body 23 with horizontal plate portion 41 thereof fixedly secured on the undersurface of bicycle outer base 27 and with parallel arranged reach elements 43, 43' depending vertically. An inverted U-configured reinforcing rib 55 struck respectively from parent material of pivot bracket 40 reinforce reach elements 43, 43' of the pivot bracket. The distal lower end portions respectively of reach elements 43, 43' include structure defining a horizontally aligned pair of apertures 57, 57'.

U-shaped clamp 45 connects seat bracket 40 to bicycle seat post 17 and is firmly secured with the bight portion thereof firmly embracing the seat post. Post clamp 45 includes tab elements 58, 58' including inwardly projecting confrontingly arranged flange portions 59, 59' and includes structure defining a pair of aligned apertures 61, 61'. The tab elements 58, 58' are smooth on the outer faces 62, 62' thereof (face 62' not shown), as opposed to the serrations or grooves on the clamp of said Patent No. 2,946,372.

Pair of shoulder washers 47, 47' each are alike and include respectively sleeve-like shoulder portions 63, 63' and flat radially extending thrust portions 64, 64'. Thrust portions 64, 64' are arranged respectively on one end portion of shoulder portions 63, 63' and are generally flat disklike in configuration. Shoulder washers 47, 47' are arranged with thrust portions 64, 64' being in parallel relation and with shoulder portions 63, 63' projecting oppositely and extending respectively through apertures 57, 57' of pivot bracket reach elements 43, 43'. Thrust portions 64, 64' of the shoulder washers are interposedly arranged respectively between left reach and left tab elements 43, 58 and right reach and right tab elements 43', 58'. The outer cylindrical surface portions of shoulder washers shoulder portions 63, 63' each are of a size to snugly but freely be received respectively in apertures 57, 57' of pivot bracket reach elements 43, 43'. Shoulder portions 63, 63' of the shoulder washers turnably engage the aperture structures 57, 57' of the reach elements and provide pivot bearing means for seat supporting structure 11.

Bolt 51 is of any suitable type and includes a head 64. Shank portion 67 of bolt 51 is inserted through reach apertures 57, 57'; apertures 69, 69' of shoulder washers 47, 47', and apertures 61, 61' of clamp 45. Flat washers 49, 49' are arranged respectively on opposite end portions of bolt 51 and concentrically abuttingly engage respectively distal edge annular surfaces 71, 71' of shoulder washer shoulder portions 63, 63'. Bolt and nut means 51, 53 are contradirectionally turned inwardly to a locked condition and in such condition provides two distinct functions; (1) tightening bolt and nut means 51, 53 convergingly presses tab elements 58, 58' of seat post clamp and clampingly secures the clamp on the seat post. (2) Tightening bolt and nut means 51, 53 unitarily fixedly secures together clamp tab elements 58, 58'; shoulder washers 47, 47'; and flat washers 49, 49'. Thus, it will be understood that bolt and nut means 51, 53; clamp 45; shoulder washers 47, 47'; and flat washers 49, 49' are free to pivot relative to bracket 40 about an axis coincident with the axis of bolt 51 and yet the bicycle seat 19 is held against lateral swinging or twisting movement of the rearward portion thereof.

Bolt and nut means 51, 53 may be arranged forwardly or rearwardly of bicycle seat post 17 for changing the fore and aft adjustment of the bicycle seat: To change bolt and nut means 51, 53 on either side of seat post 17, clamp 45 may be turned 180° either on a vertical or a horizontal axis and thus be arranged forwardly or rearwardly to obtain respectively a rearward or a forward adjustment of the bicycle seat. The vertical adjustment of seat supporting pivot means 11 may be adjusted by manipulating bolt and nut means 51, 53 and clamping clamp 45 at a desired elevation on the bicycle seat post.

I claim:

1. Seat supporting pivot means adapted for use in a bicycle having an elongated seat having a seat body, the bicycle having a seat post and having resilient support means yieldably supporting the rearward portion of the seat, said bicycle seat supporting pivot means comprising bracket means subjacently firmly secured on the seat body including parallel left and right flat reach elements arranged flatwise relative to and spaced equidistantly on opposite sides of a vertical datum plane extending longitudinally and in the transverse center of the seat body and having structure defining left and right horizontally aligned apertures, and including a U-shaped clamp having a bight portion adapted for snugly engaging a lateral circumferential surface portion of said post including oppositely arranged left and right tab elements arranged respectively between and in parallel relationship respectively with said left and right reach elements, said left and right tab elements respectively having structure defining left and right horizontally aligned apertures, a headed bolt having a threaded shank extending through the aligned apertures of said reach elements and said tab elements, left and right shoulder washers each having a sleeve-like shoulder portion and a radially projecting circumferentially extending thrust portion arranged circumferentially about one end portion of said shoulder portion, said left and right shoulder washers being arranged with said thrust portions parallel and with said shoulder portions projecting oppositely and extending respectively through said apertures of said left and right reach elements and with said thrust portions respectively of said left and right shoulder washers being interposedly arranged respectively between said left reach and left tab elements and said right reach and right tab elements, left and right flat washer members flatwise engaging respectively the distal edge annular surfaces respectively of said shoulder portions of said shoulder washers, and a nut threaded on said bolt and tightly run up, the nut and bolt means simultaneously tightly clamping said tab elements and fixedly clamping said bight portion of said clamp tightly about said post and also unitarily fixing together said clamp tab elements, said shoulder washers and said flat washers; the sleevelike shoulder portions respectively of said left and right shoulder washers defining pivot bearing means for pivotally anchoring the forward portion of said seat to the bicycle seat post.

2. Seat supporting pivot means adapted for use in a bicycle having an elongated seat having a seat body, the bicycle having a seat post and having a resilient support means for yieldably supporting a portion of said seat, said bicycle seat supporting pivot means comprising a pair of flat reach elements including a left and a right reach element arranged flatwise relative to and spaced equally from opposite sides of a vertical datum plane extending longitudinally and in the transverse center of the seat body and having structure defining left and right horizontally aligned apertures, a U-shaped clamp including a bight portion adapted to be fixedly secured transversely about said seat post and having parallel arranged left and right tab elements arranged respectively between said reach elements and including structure defining a left and a right tab aperture, a left and a right shoulder washer each having a sleeve-like shoulder portion and having a flat radially and circumferentially extending thrust portion, the left and right shoulder washers being arranged with said shoulder portions projecting oppositely and extending respectively through the apertures of said reach elements and with the thrust portions respectively of said shoulder washers being arranged respectively between left reach and tab elements and right reach and tab elements, and including means simultaneously unitarily tensioning said clamp tab elements and said reach elements together and clampingly fixedly securing said bight portion of said clamp transversely on the seat post of the bicycle.

References Cited

UNITED STATES PATENTS

| | | | |
|---|---|---|---|
| 2,471,627 | 5/1949 | Kalter | 248—221 |
| 2,476,226 | 7/1949 | Schwinn | 297—195 |
| 2,946,372 | 7/1960 | Kalter | 287—1 |

FOREIGN PATENTS

| | | |
|---|---|---|
| 11,918 | 1908 | Great Britain. |

ROY D. FRAZIER, Primary Examiner

J. F. FOSS, Assistant Examiner

U.S. Cl. X.R.

248—230; 280—289; 297—195